US010554505B2

United States Patent
Ganguli et al.

(10) Patent No.: US 10,554,505 B2
(45) Date of Patent: Feb. 4, 2020

(54) MANAGING DATA CENTER RESOURCES TO ACHIEVE A QUALITY OF SERVICE

(71) Applicant: Intel Corporation, Santa Clara, CA (US)

(72) Inventors: Mrittika Ganguli, Bangalore (IN);
Muthuvel M. I, Bangalore (IN);
Ananth S. Narayan, Bangalore (IN);
Jaideep Moses, Portland, OR (US);
Andrew J. Herdrich, Hillsboro, OR (US); Rahul Khanna, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 958 days.

(21) Appl. No.: 13/630,545

(22) Filed: Sep. 28, 2012

(65) Prior Publication Data

US 2014/0095691 A1    Apr. 3, 2014

(51) Int. Cl.
*H04L 12/24* (2006.01)

(52) U.S. Cl.
CPC ............ *H04L 41/50* (2013.01); *H04L 41/145* (2013.01); *H04L 41/5009* (2013.01); *H04L 41/5025* (2013.01)

(58) Field of Classification Search
CPC . H04L 41/50; H04L 41/5025; H04L 41/5009; H04L 41/145; H04L 12/24; H04L 29/08072; H04L 29/06; H04L 43/00; H04L 12/2602; H04L 41/22
USPC ........... 709/224; 370/252; 714/39, 47.1–47.3
See application file for complete search history.

(56) References Cited

U.S. PATENT DOCUMENTS

| 6,748,558 | B1 * | 6/2004 | Gonzales | G06F 11/3409 |
| | | | | 702/182 |
| 8,229,726 | B1 * | 7/2012 | Magdon-Ismail | ......... |
| | | | | G06F 17/5022 |
| | | | | 703/14 |
| 8,572,295 | B1 * | 10/2013 | Cai | G06F 11/349 |
| | | | | 710/15 |
| 8,826,270 | B1 | 9/2014 | Lewis et al. | |
| 2003/0065886 | A1 * | 4/2003 | Olarig | G06F 12/084 |
| | | | | 711/129 |

(Continued)

OTHER PUBLICATIONS

Ntel Performance Counter Monitor—A better way to measure CPU utilization by Thomas et al. Published on Aug. 16, 2012 by Intel.*

(Continued)

*Primary Examiner* — Tonia L Dollinger
*Assistant Examiner* — Mehulkumar J Shah
(74) *Attorney, Agent, or Firm* — Patent Capital Group

(57) ABSTRACT

In accordance with some embodiments, a cloud service provider may operate a data center in a way that dynamically reallocates resources across nodes within the data center based on both utilization and service level agreements. In other words, the allocation of resources may be adjusted dynamically based on current conditions. The current conditions in the data center may be a function of the nature of all the current workloads. Instead of simply managing the workloads in a way to increase overall execution efficiency, the data center instead may manage the workload to achieve quality of service requirements for particular workloads according to service level agreements.

27 Claims, 4 Drawing Sheets

(56) References Cited

U.S. PATENT DOCUMENTS

| | | | |
|---|---|---|---|
| 2007/0185990 A1* | 8/2007 | Ono | G06F 11/3409 709/224 |
| 2007/0300231 A1* | 12/2007 | Aguilar et al. | 718/104 |
| 2008/0263324 A1* | 10/2008 | Sutardja | G06F 1/3203 712/43 |
| 2009/0172315 A1* | 7/2009 | Iyer | G06F 9/5016 711/158 |
| 2009/0182994 A1* | 7/2009 | Bell et al. | 712/227 |
| 2009/0265568 A1* | 10/2009 | Jackson | G06F 1/3203 713/320 |
| 2010/0095300 A1* | 4/2010 | West | G06F 9/5016 718/104 |
| 2010/0115095 A1* | 5/2010 | Zhu | H04L 67/12 709/226 |
| 2011/0022812 A1* | 1/2011 | van der Linden | G06F 9/5077 711/163 |
| 2011/0252199 A1* | 10/2011 | Serrano | G06F 11/3476 711/118 |
| 2011/0302372 A1 | 12/2011 | Fontenot et al. | |
| 2012/0042131 A1* | 2/2012 | Flemming | G06F 12/0284 711/129 |
| 2012/0102270 A1* | 4/2012 | Chishti | G06F 12/126 711/133 |
| 2012/0210068 A1 | 8/2012 | Joshi et al. | |
| 2013/0054897 A1* | 2/2013 | Flemming | G06F 12/0888 711/122 |
| 2013/0145135 A1* | 6/2013 | Bell, Jr. | G06F 11/30 712/239 |
| 2013/0238780 A1 | 9/2013 | Devarakonda et al. | |
| 2013/0311804 A1 | 11/2013 | Garg et al. | |
| 2014/0068075 A1 | 3/2014 | Bonilla et al. | |

OTHER PUBLICATIONS

Intel Performance Counter Monitor—by Thomas et al., (hereinafter as "NPL") (Year: 2012).*

Non Final Office Action issued in U.S. Appl. No. 15/926,866 dated Apr. 29, 2019, 27 pages.

Moses, J., et al., "Rate-Based QoS Techniques for Cache/Memory in CMP Platforms," ICS '09 Proceedings of the 23rd international conference on Supercomputing, Jun. 2009, pp. 479-488 (9 pages), Retrieved from ACM Digital Library on Aug. 13, 2013; http://dl.acm.org/.

Moses, J., et al. "Shared Resource Monitoring and Throughput Optimization in Cloud-Computing Datacenters." Parallel & Distributed Processing Symposium (IPDPS), 2011 IEEE International. IEEE, 2011, 9 pages, Retrieved from Internet on Jan. 2, 2013; http://www.princeton.edu/~carch/kaisopos/papers/MIMe_IPDPS_2011.pdf.

* cited by examiner

MANAGING DATA CENTER RESOURCES TO ACHIEVE A QUALITY OF SERVICE

BACKGROUND

This relates generally to cloud computing and particularly to data centers for cloud computing.

Cloud computing is a large scale distributed computing center including a plurality of servers. The basis for cloud computing is the economy of scale that may be achieved from large data centers with many servers serving a large number of users who have needs that vary over time. The cloud computing data center includes a pool of abstracted, virtualized, dynamically-scalable managed computing cores together with storage, platforms and services. The cloud computing service is delivered on demand to external customers over the Internet.

In cloud computing, customers contract with the cloud service provider to receive cloud services. In some cases, a legally binding contract known as a service level agreement (SLA) may be entered between the cloud service provider and the customer who wants its applications to run on the cloud. The service level agreement may include things such as a maximum response time, an error rate, and a throughput.

Cloud service providers may have difficulty in consistently providing the performance levels that customers expect or have specifically paid for (quality of service) because the cloud service provider generally receives no information about the nature of the workload. Thus, the data center operated by the cloud service provider may be running many workloads that may produce contention. For example, two different workloads from two different customers may contend within the data center because they both require high usage of cache storage. This may slow performance. But because a cloud service provider has no idea about the characteristics of the workload that it receives, it may very difficult for the cloud service provider to efficiently manage and allocate its resources.

One reason for this lack of information is that the way the cloud service works is that generally the cloud service provider gets no information about the workloads that it is receiving on account of the confidentiality of those workloads. Moreover in order to take all corners, it is preferable, to many cloud service users, that the cloud service provider has no information about the workload itself, the nature of the executables, or the nature of the applications themselves.

BRIEF DESCRIPTION OF THE DRAWINGS

Some embodiments are described with respect to the following figures.

DETAILED DESCRIPTION

In accordance with some embodiments, a cloud service provider may operate a data center in a way that dynamically reallocates resources across nodes within the data center based on both utilization and service level agreements. In other words, the allocation of resources may be adjusted dynamically based on current conditions. The current conditions in the data center may be a function of the nature of all the current workloads. Instead of simply managing the workloads in a way to increase overall execution efficiency, the data center instead may manage the workload to achieve quality of service requirements for particular workloads according to service level agreements.

The data center considers not only the nature of the ongoing performance of workloads but also to the achievement of the quality of service agreements for specific workloads. Thus resources, such as caches, memory capacity, memory bandwidth, bandwidth to disks, etc., may be allocated across the data center based not just on what is best for the overall performance of the data center, but particularly on what is needed to achieve quality of service levels for particular nodes. Therefore, caches may be allocated to nodes unfairly in some cases in order to ensure that workloads with higher quality of service guarantees receive preference.

Figure 1:
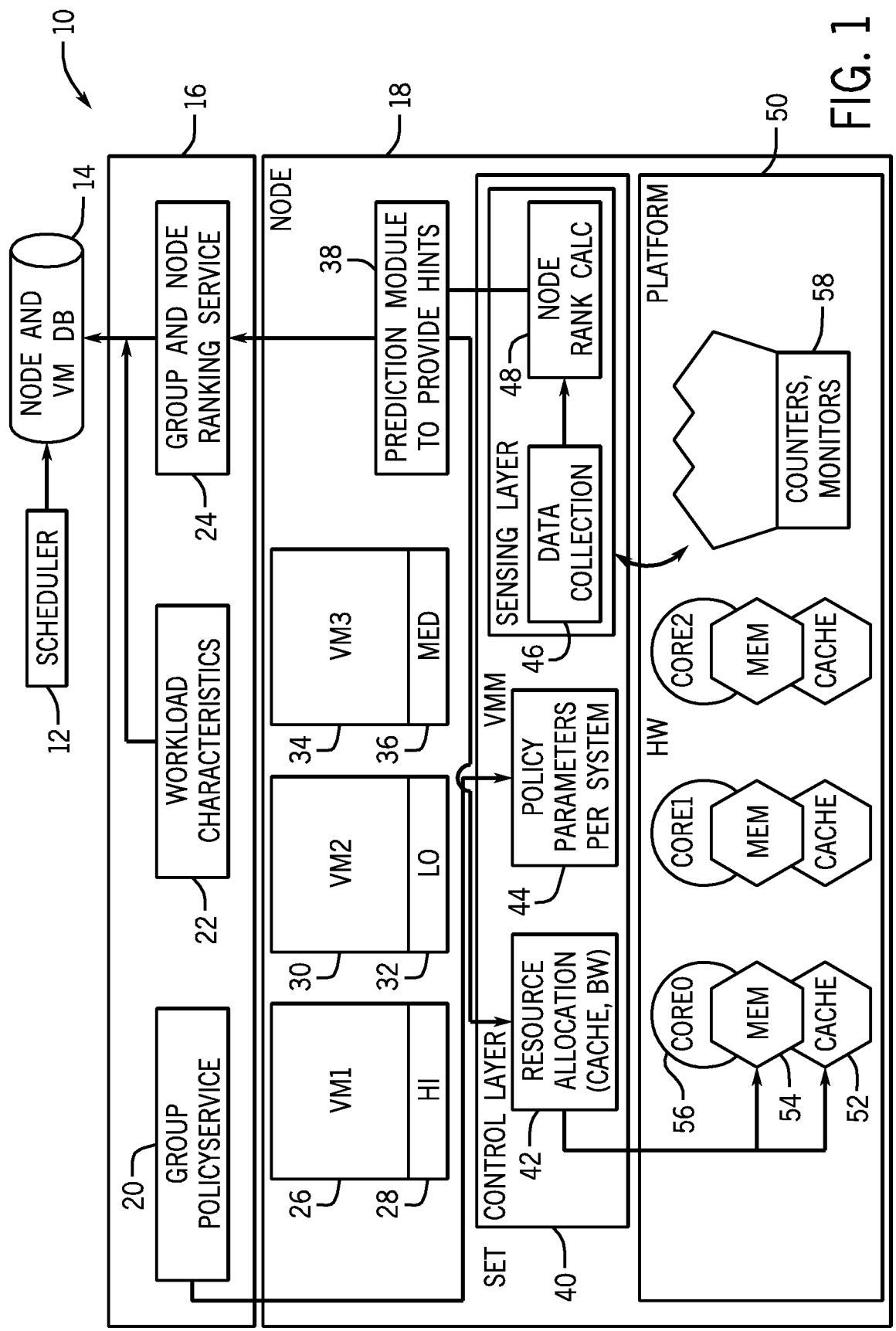
FIG. 1 is a high-level depiction of a cloud quality of service solution according to one embodiment, as disclosed herein.

Referring to FIG. 1, a system for automatically allocating work within a data center 10 may include a number of performance monitors including both counters and monitors 58. Each node corresponds generally to a cluster of cores, or a server or other unit of computing power. Each core may include existing sensors that provide information useful in accessing the performance of that particular node and resources thereon.

In some embodiments it is advantageous to collect sensor data that gives an indication of the performance of certain resources on a node such as cache utilization performance. For example, onboard sensors, in-silicon sensors, performance counters, hardware monitors, and built-in performance monitor counters can be used to estimate cache occupancy. Particularly the kind of information that may be collected, in some cases, includes misses per instruction, latency, memory bandwidth and instructions per cycle.

In some cases the available sensor data may be different across each node or core. But in some embodiments, the system may be able to use whatever available data exists in order to determine a metric that provides a level of current node performance.

The available cache activity data from each core may be used to develop a performance metric that may be normalized across all the nodes within the data center, even in those cases where different nodes include different performance monitoring capabilities. For example, in some cases, both cache misses and instructions per cycle may be monitored in order to access overall performance of caches. As an example of a metric, the number of misses of a particular cache may be determined as a ratio of the total number of misses of caches across the data center in order to determine a metric that may be a normalized measure that enables performance of different caches at particular instances of time to be compared.

Then the array of ratios may be assigned values from zero (being the lowest) to one, to enable a ranking of caches at the current time against other caches. In cases where more than one metric is used, such as a metric for instructions per cycle and for cache misses, the two metrics may be simply added together and then divided by two to give a single scalable performance metric for the core or node.

Then performance may be improved by either avoiding conflicting loads on the same core or moving resources such as caches from being associated with one core to another core. In other words, cache way allocation may be managed across the entire data center. In addition to core/cache mappings workload placement/resource allocation across sockets, across nodes, across racks, etc. may be changed to manage cache allocation across the data center.

Figure 2:
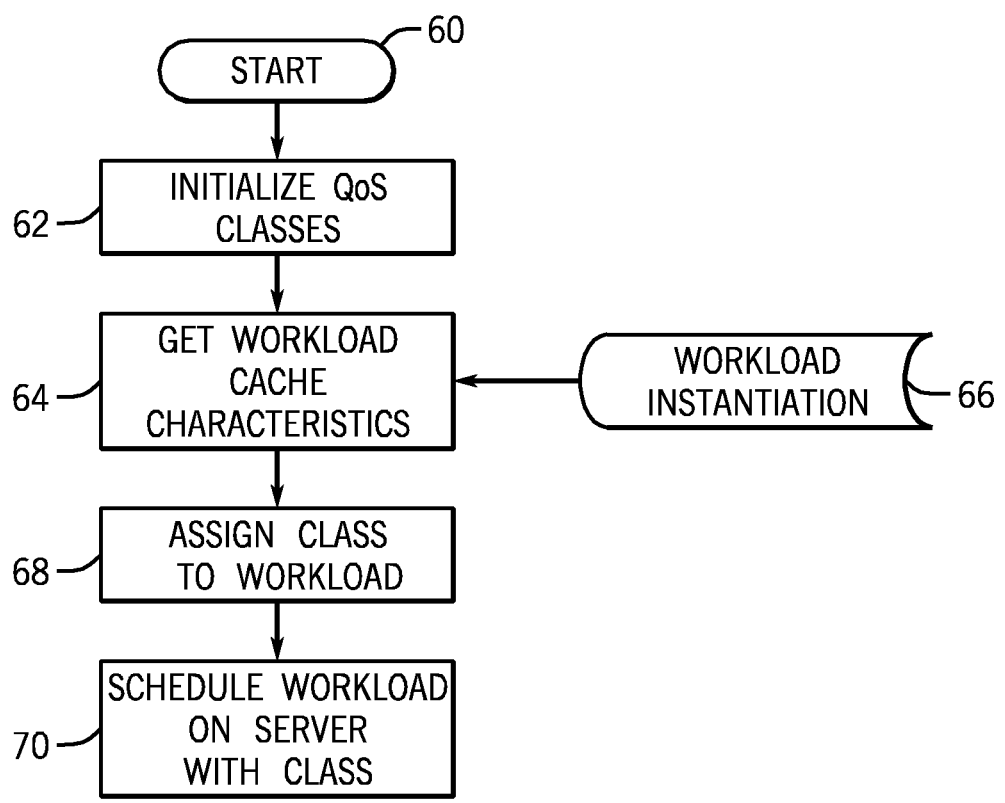
FIG. 2 is a flow chart for a sequence according to one embodiment.

Thus in FIG. 2, the data center 10 may include a scheduler 12 that schedules nodes and virtual machines using a database 14. A group module 16 may include a group policy service 20, a workload characteristic database 22 and a group and node ranking service 24 that provides information to the database 14. Each node 18 may include a plurality of hardware cores, in this case, three cores labeled core0, core1, and core2 within a platform 50. However the number of cores is certainly a variable and may be any number of cores possible with existing technology. Those cores may make use of the counters and performance monitors 58 already onboard the platform 50.

The data center also includes a control layer 40 that includes a resource allocation module that reallocates resources such as caches and bandwidth to meet goals of the system, including improved performance and meeting any application specific quality of service requirements. Policy parameters may be invoked per system using a policy parameter module 44 within the virtual machine monitor (VMM). A sensing layer may include a data collection module 46 and a node rank calculator 48. Thus a data collection module 46 collects data from a variety of platform sources including onboard sensors, in-silicon sensors, performance monitors and whatever else is available. This information is then transformed into a performance ranking to dynamically measure a performance metric on an ongoing basis. This measurement may be through hardware counters in the case of a metric such as instructions per cycle, misses per instruction, latency and memory bandwidth. Then a mechanism may be provided to manage the cache way allocation using the resource allocation module 42.

Machine learning may also be used to predict the dynamic need for cache requirements for each workload going forward. In some embodiments resources such as caches may be dynamically migrated from less needy applications to more cache hungry ones and be allocated or returned as the need for extra cache performance changes. All these allocations may also be based in part on the quality of service guarantee arising from service level agreements.

The sensing layer and service node has a controller including a data collection module 46 to monitor workload performance. It may calculate performance rank on a node-by-node or socket-by-socket basis. In some embodiments node performance is a function of instructions per cycle, misses for instruction, memory bandwidth and socket level latency. Policy parameters defined in the policy parameter module 44 may be based on maximizing instructions per cycle or reducing cache misses as two examples. A prediction module 38 may predict the instructions per cycle of the cache misses as two examples going forward. The prediction module 38 may predict to form hints on how to rebalance resources. The prediction module in one embodiment may create a table of combinations of cache ways, cores and threads that are possible in the particular node. Then it may simulate allocation of random cache ways to each workload mapped to particular cores. Next the prediction module may measure last level cache (LLC) misses, overall instructions per cycle, and memory bandwidth in one embodiment. This data may be used to predict the cache miss rate and the instructions per cycle going forward, given current workloads.

The probabilities of each cache way or amount of cache allocation may be determined to reduce the level of last level cache misses and to increase instructions per cycle. A database may be built against each workload identifier. For each shared cache, the data in terms of the probabilities of each cache way or the amount of cache allocation may be correlated to that of other workloads on the same shared memory. Then a decision tree may be prepared for each core based on the desired impact of each workload. Other prediction mechanisms may also be utilized.

Referring to FIG. 2, in a static partitioning example, cache classes at the server node may be defined upfront and are available to the cloud workload scheduling database 14 in FIG. 1. The scheduler 12 assigns a workload to a particular service class based on the workload's quality of service requirements.

After starting at 60, the quality of service classes may be initialized as indicated in block 62. The workload cache characteristics may be obtained in 64 from a workload instantiation 66. Then a class may be assigned to the workload in 68 and the workload may be scheduled on the server based on the class as indicated in block 70.

In contrast, in dynamic partitioning, the node agents monitor and analyze the monitored data to create models. Cache requirements of a workload may be predicted based on this data. The models and the monitored data are made available to a zone controller but also has the knowledge of the cache requirements of other workloads executing in the group.

Figure 3:
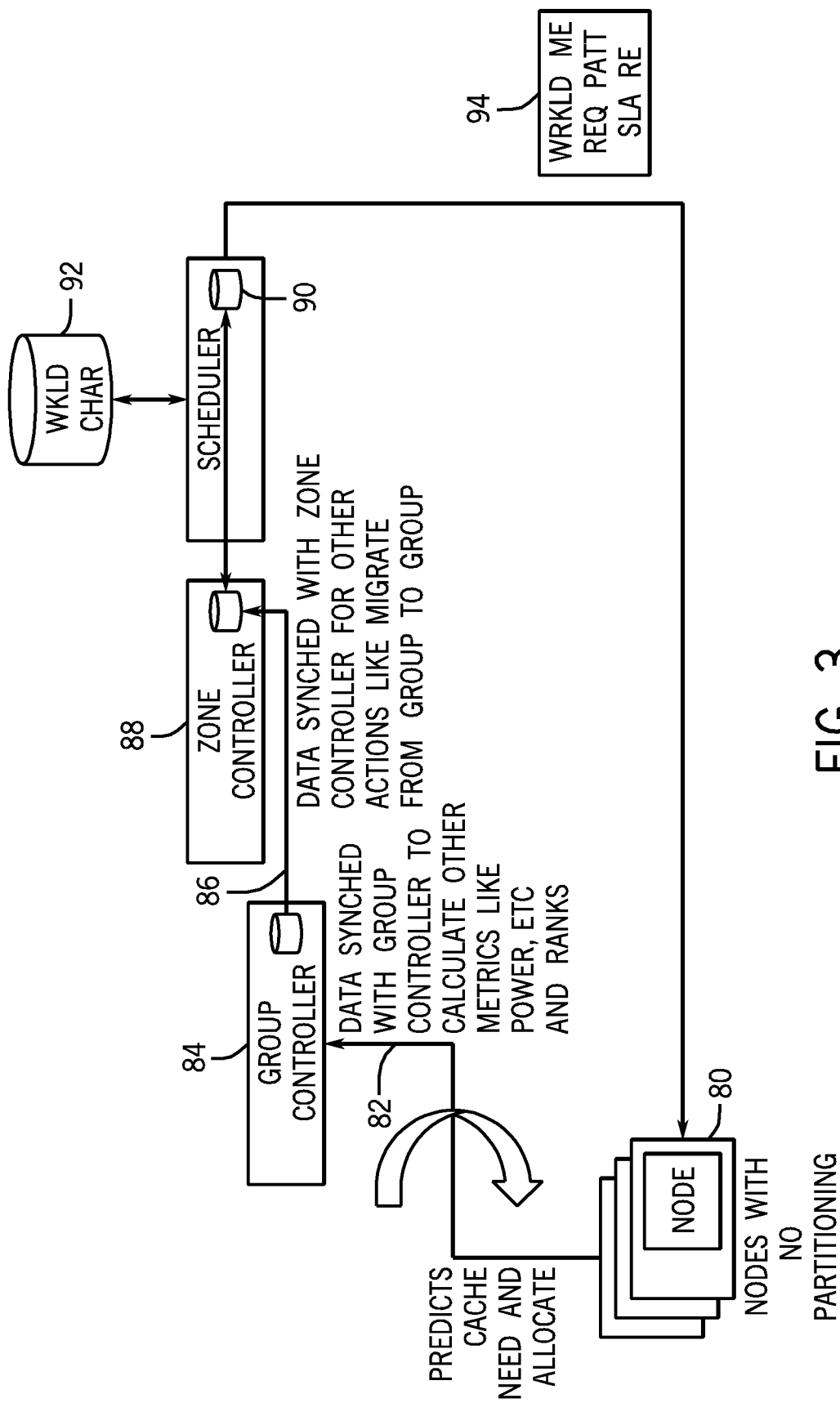
FIG. 3 is a depiction of a dynamic quality of service data flow across nodes, a group and a zone according to one embodiment.

Thus as shown in FIG. 3, the node 80 may be coupled to a group controller 84, in turn coupled to a zone controller 88 which is coupled to a scheduler 90 and a workload characterizer 92. The workload may be scheduled based on the service level agreement requirements contained in a database 94. The node agent among the nodes 80 discovers the settings for every core if present.

Next the workload pattern, and the workload service level agreement, characterized as high, medium or low in one embodiment, at the time of launch may be transferred from the zone to the particular node. This may be done using Extensible Markup Language (XML) in one embodiment. Then the workload virtual machine (VM) is allocated a class of service such as high, medium or low.

The node agent sets an identifier for these cores and maps them to a workload identifier. Then a node sets the monitoring of one or more characteristics based on the identifier. The characteristics could be, in one embodiment, last level cache misses, and memory bandwidth. Next the node monitors other counters per core, and non-core based monitors and feeds them to the prediction logic. The prediction logic creates a rule for the cache needs and allocates cache ways from a pool for the cores associated with this workload based on the predicted need. The cache needs of other cores may be used to allocate caches to all workloads updated based on the prediction logic optimization function. Then the node agent monitors the memory bandwidth availability. If bandwidth starts to exceed a latency bandwidth threshold, the cache allocation is no longer manipulated, as the system has reached a saturation point.

Figure 4:
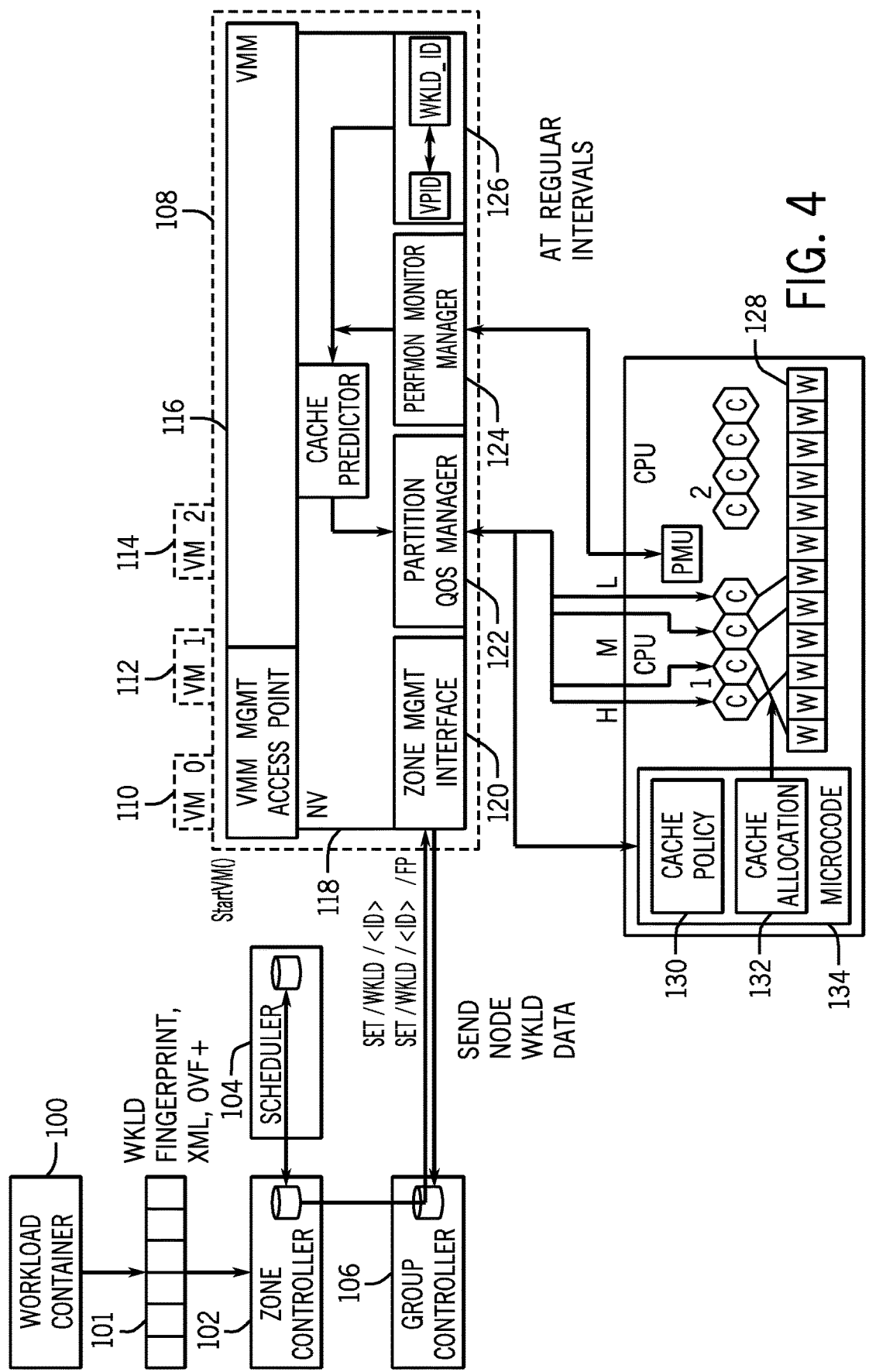
FIG. 4 is a depiction of a cloud workload automation with dynamic cache allocation policy according to one embodiment.

A cloud workload automation with dynamic cache allocation is shown in FIG. 4. It begins by creating a workload pattern 101 for the workload from a workload container 100. For example, a two bit node performance value may be calculated for each node/socket. The node performance may be a function of instructions per cycle, misses per instruction, memory bandwidth and socket latency per cycle. The workload to be placed on a virtual machine 108 on a managed server 118 is transferred through zone controller 102 and group controller 106 to a zone management interface 120. The zone controller is coupled to a scheduler 104. The virtual machines 110, 112, and 114 are provided on the managed server 118 in this example. A database is built against each workload identifier based on quality of service requirements. The cloud scheduler 104 allocates and starts the workload on the virtual machine. The management agent on the server maps each core to classes of service based on what workload is placed on the core. Then the management agent reads performance counters (PMU) for the workload at regular intervals. Monitored data from a performance monitor manager 124, and workload identifier 126 is fed to a cache predictor 136. The processor (CPU) includes microcode 134 to implement a cache policy 130 and cache allocation 132.

Based on the cache prediction, the management agent prepares a mapping of last level cache missed values to cache values required based on a prediction tree and sends it to partition QoS manager 102. A cache policy is set based on that mapping. The agent also sets the threshold for misses standard deviation that will be taken for consideration for cache allocation decisions. Then the processor allocates the cache at regular intervals in some embodiments. The management agent sends server performance data to the cloud service database used by the scheduler to make a decision on scheduling.

Machine learning may be used to identify the optimal distribution of cache resources amongst CPU cores. Each core is running a workload competing for cache resources. The process comprises a training process and reconfiguration process.

The training process comprises profiling the cache miss rate for a short duration of time. During this training cycle, various cache slices and cache sharing configurations are applied. A cost function that validates each of these configurations is given by:

$$\alpha \sum_{i}^{n} \left( \frac{Miss_i}{Hit_i + Miss_i} \right) + \beta \frac{1}{Total\_Miss\_Rate * Max\_Cache} \sum_{i}^{n} (Miss\_Rate_i * Cache_i)$$

where, $\alpha + \beta = 1$;
$Miss_i$ = Number of Misses of CPU I;
$Hit_i$ = Number of Hits of CPU I;
$Miss\_Rate_i$ = Miss rate of CPU I; and
$Cache_i$ = Amount of cache allocated to CPU i.

A training methodology attempts to maximize the above cost function by identifying a cache distribution amongst competing cores.

Once a trained model is obtained, the best cache distribution configuration may be identified and applied through a set of hardware registers.

This process continues to compensate for changes in workload or its phases. The training process is a dynamic process that is always trying to find an optimal cache distribution solution for a given load. Other machine learning techniques may also be used.

Additional Notes And Examples

One example embodiment may be one or more computer readable media storing instructions executed by a data center, including a plurality of processors, to perform a sequence analyzing data from a performance monitor from one of said processors, developing a performance metric based on said data, and using the performance metric and a quality of service value to dynamically reallocate resources within the data center. The media may include receiving performance monitor data from at least two cores, each core providing different types of performance monitor data. The media may include analyzing performance monitor data about instructions per cycle. The media may include receiving performance monitor data including cache misses. The media may include receiving performance monitor data about memory bandwidth. The media may include where analyzing data includes analyzing data from a performance monitor to determine instructions per cycle and cache misses. The media may include using the performance metric and quality of service value to reallocate lower level caches within a data center. The media may include reallocating cache space from one node in the data center to another node in the data center.

Another example embodiment may be a method comprising analyzing data from a performance monitor, developing a performance metric based on said data; and using the performance metric and a quality of service value to dynamically reallocate resources within a data center. The method may also include receiving performance monitor data from at least two cores, each core providing different types of performance monitor data. The method may also include analyzing performance monitor data about instructions per cycle. The method may also include receiving measurements of cache occupancy.

One example embodiment may be a server comprising a performance monitor, a processor to analyze data from the performance monitor, develop a performance metric based on said data, use the performance metric and a quality of service value to reallocate resources within a data center, and a storage coupled to said processor. The server may also include said processor to analyze performance monitor data about instructions per cycle. The server may also include said processor to receive performance monitor data including cache misses. The server may also include said processor to receive performance monitor data about memory bandwidth. The server may also include said processor to analyze data includes analyzing data from a performance monitor to determine instructions per cycle and cache misses. The server may also include said processor to use the performance metric and quality of service value to reallocate lower level caches within a data center. The server may also include said processor to reallocate cache space from one node in the data center to another node in the data center. The server may also include said processor to dynamically reallocate data on a periodic basis.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method, comprising:
receiving cache activity data from each hardware monitor of a plurality of hardware monitors, wherein each hardware monitor is associated with a corresponding processor of a plurality of processors in a data center and is to monitor a performance of the corresponding processor;
determining, based on the cache activity data received from each hardware monitor and for each cache of a plurality of caches, a ratio of (i) a total number of cache misses for the corresponding cache over (ii) a sum of the total number of cache misses of each cache of the plurality of caches;
assigning for each cache of the plurality of caches a rank value based on the ratio associated with the corresponding cache;
determining a performance metric for each cache of the plurality of caches based on the rank values of each corresponding cache; and
dynamically reallocating resources within the data center based on the performance metric and a quality of service value for a particular workload on a processor of the plurality of processors.

2. The method of claim 1, wherein receiving the cache activity data comprises receiving cache activity data from at least two cores, each core providing different types of cache activity data.

3. The method of claim 1, wherein receiving the cache activity data comprises receiving information about instructions per cycle.

4. The method of claim 1, wherein receiving the cache activity data comprises receiving measurements of cache occupancy.

5. The method of claim 1, wherein receiving the cache activity data comprises receiving information about memory bandwidth.

6. The method of claim 1, wherein receiving the cache activity data includes receiving the cache activity data from a hardware monitor to predict instructions per cycle and cache misses.

7. The method of claim 1, wherein dynamically reallocating resources comprises dynamically reallocating lower level caches within a data center to different virtual machines.

8. The method of claim 7, wherein dynamically reallocating resources comprises dynamically reallocating cache space from one node in the data center to another node in the data center.

9. The method of claim 1, wherein dynamically reallocating resources comprises dynamically reallocating on a periodic basis.

10. The method of claim 9, wherein dynamically reallocating resources is dependent on quality of service factors and de-emphasizes traditional efficiency allocations.

11. A server, comprising:
a processor;
a storage coupled to said processor; and
a hardware monitor associated with the processor, wherein the hardware monitor is to monitor a performance of the processor;
wherein the processor is to:
receive cache activity data from the hardware monitor,
determine, based on the cache activity data received from the hardware monitor and for each cache of a plurality of caches of the server, a ratio of (i) a total number of cache misses for the corresponding cache over (ii) a sum of the total number of cache misses of each cache of the plurality of caches,
assign for each cache of the plurality of caches a rank value based on the ratio associated with the corresponding cache;
determine a performance metric for each cache of the plurality of caches based on the rank values of each corresponding cache, and
dynamically reallocate resources within the server based on the performance metric and a quality of service value for a particular workload on the processor.

12. The server of claim 11, wherein receipt of the cache activity data comprises receipt of information about instructions per cycle.

13. The server of claim 11, wherein receipt of the cache activity data comprises receipt of information about cache misses.

14. The server of claim 11, wherein receipt of the cache activity data comprises receipt of information about memory bandwidth.

15. The server of claim 11, wherein determination of the cache activity data includes receipt of the cache activity data from the hardware monitor to determine instructions per cycle and cache misses.

16. The server of claim 11, wherein dynamic reallocation of resources comprises dynamic reallocation of lower level caches within a data center.

17. The server of claim 11, wherein dynamic reallocation of resources comprises dynamic reallocation of cache space from one node in a data center to another node in the data center.

18. The server of claim 11, wherein dynamic reallocation of resources comprises dynamic reallocation of the cache activity data on a periodic basis.

19. One or more non-transitory computer readable media storing instructions executable by one or more processing devices associated with a data center, wherein the data center includes a plurality of processors and a plurality of caches, and wherein the instructions are executable to:
receive cache activity data from each hardware monitor of a plurality of hardware monitors, wherein each hardware monitor is associated with a corresponding processor of the plurality of processors and is to monitor a performance of the corresponding processor;
determine, based on the cache activity data received from each hardware monitor and for each cache of the plurality of caches, a ratio of (i) a total number of cache misses for the corresponding cache over (ii) a sum of the total number of cache misses of each cache of the plurality of caches;
assign for each cache of the plurality of caches a rank value based on the ratio associated with the corresponding cache;
determine a performance metric for each cache of the plurality of caches based on the rank values of each corresponding cache; and
dynamically reallocate resources within the data center based on the performance metric and a quality of service value for a particular workload on a processor of the plurality of processors.

20. The media of claim 19, wherein receipt of the cache activity data comprises receipt of the cache activity data from at least two cores, each core providing different types of cache activity data.

21. The media of claim 19, wherein receipt of the cache activity data comprises receipt of information about instructions per cycle.

22. The media of claim 19, wherein receipt of the cache activity data comprises receipt of information about cache misses.

23. The media of claim 19, wherein receipt of the cache activity data comprises receipt of information about memory bandwidth.

24. The media of claim 19, wherein receipt of the cache activity data includes receipt of the cache activity data from the hardware monitor to determine instructions per cycle and cache misses.

25. The media of claim 19, wherein dynamic reallocation of resources comprises dynamic reallocation of lower level caches within a data center.

26. The media of claim 19, wherein dynamic reallocation of resources comprises dynamic reallocation of cache space from one node in the data center to another node in the data center.

27. The media of claim 19, wherein dynamic reallocation of resources comprises dynamic reallocation of data on a periodic basis.

\* \* \* \* \*

UNITED STATES PATENT AND TRADEMARK OFFICE
CERTIFICATE OF CORRECTION

PATENT NO. : 10,554,505 B2
APPLICATION NO. : 13/630545
DATED : February 4, 2020
INVENTOR(S) : Mrittika Ganguli et al.

It is certified that error appears in the above-identified patent and that said Letters Patent is hereby corrected as shown below:

On the Title Page

In Column 2, Item (56), under "OTHER PUBLICATIONS", Line 2, Delete "Ntel" and insert -- Intel --, therefor.

Signed and Sealed this
Seventh Day of April, 2020

Andrei Iancu
*Director of the United States Patent and Trademark Office*